(12) United States Patent
Node-Langlois et al.

(10) Patent No.: US 7,885,441 B2
(45) Date of Patent: Feb. 8, 2011

(54) SYSTEMS AND METHODS FOR IMPLANT VIRTUAL REVIEW

(75) Inventors: Laurent Jacques Node-Langlois, Boston, MA (US); Cristian Atria Cravatto, Wakefield, MA (US)

(73) Assignee: General Electric Company, Schenectady, NY (US)

( * ) Notice: Subject to any disclaimer, the term of this patent is extended or adjusted under 35 U.S.C. 154(b) by 1155 days.

(21) Appl. No.: 11/548,576

(22) Filed: Oct. 11, 2006

(65) Prior Publication Data

US 2008/0089566 A1    Apr. 17, 2008

(51) Int. Cl.
*G06K 9/00* (2006.01)
*A61B 5/05* (2006.01)

(52) U.S. Cl. ..................... 382/128; 600/426
(58) Field of Classification Search .......... 128/920, 128/922; 250/370.08, 370.09, 370.1; 382/100, 382/128–132, 294; 378/16, 19, 20, 62; 600/407, 600/424–428; 606/130
See application file for complete search history.

(56) References Cited

U.S. PATENT DOCUMENTS

| | | | |
|---|---|---|---|
| 6,470,207 B1 * | 10/2002 | Simon et al. | 600/426 |
| 7,664,542 B2 * | 2/2010 | Boese et al. | 600/411 |
| 2003/0073901 A1 * | 4/2003 | Simon et al. | 600/424 |
| 2007/0238952 A1 * | 10/2007 | Boese et al. | 600/407 |
| 2007/0270680 A1 * | 11/2007 | Sheffer et al. | 600/407 |
| 2008/0119712 A1 * | 5/2008 | Lloyd | 600/407 |
| 2008/0172383 A1 * | 7/2008 | Lea et al. | 707/6 |

* cited by examiner

*Primary Examiner*—Samir A Ahmed
*Assistant Examiner*—Mehdi Rashidian
(74) *Attorney, Agent, or Firm*—McAndrews, Held & Malloy, Ltd.; Michael A. Dellapenna (57) ABSTRACT

Certain embodiments of the present invention provide systems and methods for virtual implant review. Certain embodiments provide a method for virtual implant review. The method includes registering a two-dimensional image and a three-dimensional image. The method includes detecting an implant or instrument in the two-dimensional image. The method also includes performing an initial implant registration of the implant or instrument with respect to the three dimensional image based on navigation information and refining the initial implant registration based on image data analysis to generate a refined implant registration. Additionally, the method includes displaying a representation of the implant or instrument with respect to the three-dimensional image based on the refined image registration and the refined implant registration.

15 Claims, 5 Drawing Sheets

SYSTEMS AND METHODS FOR IMPLANT VIRTUAL REVIEW

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to image-guided surgery (or surgical navigation). In particular, the present invention relates to systems and methods for implant virtual review.

Medical practitioners, such as doctors, surgeons, and other medical professionals, often rely upon technology when performing a medical procedure, such as image-guided surgery or examination. A tracking system may provide positioning information for the medical instrument with respect to the patient or a reference coordinate system, for example. A medical practitioner may refer to the tracking system to ascertain the position of the medical instrument when the instrument is not within the practitioner's line of sight. A tracking system may also aid in pre-surgical planning.

The tracking or navigation system allows the medical practitioner to visualize the patient's anatomy and track the position and orientation of the instrument. The medical practitioner may use the tracking system to determine when the instrument is positioned in a desired location. The medical practitioner may locate and operate on a desired or injured area while avoiding other structures. Increased precision in locating medical instruments within a patient may provide for a less invasive medical procedure by facilitating improved control over smaller instruments having less impact on the patient. Improved control and precision with smaller, more refined instruments may also reduce risks associated with more invasive procedures such as open surgery.

Thus, medical navigation systems track the precise location of surgical instruments in relation to multidimensional images of a patient's anatomy. Additionally, medical navigation systems use visualization tools to provide the surgeon with co-registered views of these surgical instruments with the patient's anatomy. This functionality is typically provided by including components of the medical navigation system on a wheeled cart (or carts) that can be moved throughout the operating room.

Tracking systems may be ultrasound, inertial position, or electromagnetic tracking systems, for example. Electromagnetic tracking systems may employ coils as receivers and transmitters. Electromagnetic tracking systems may be configured in sets of three transmitter coils and three receiver coils, such as an industry-standard coil architecture (ISCA) configuration. Electromagnetic tracking systems may also be configured with a single transmitter coil used with an array of receiver coils or an array of transmitter coils with a single receiver coil, for example. Magnetic fields generated by the transmitter coil(s) may be detected by the receiver coil(s). For obtained parameter measurements, position and orientation information may be determined for the transmitter and/or receiver coil(s).

In medical and surgical imaging, such as intraoperative or perioperative imaging, images are formed of a region of a patient's body. The images are used to aid in an ongoing procedure with a surgical tool or instrument applied to the patient and tracked in relation to a reference coordinate system formed from the images. Image-guided surgery is of a special utility in surgical procedures such as brain surgery and arthroscopic procedures on the knee, wrist, shoulder or spine, as well as certain types of angiography, cardiac procedures, interventional radiology and biopsies in which x-ray images may be taken to display, correct the position of, or otherwise navigate a tool or instrument involved in the procedure.

Several areas of surgery involve very precise planning and control for placement of an elongated probe or other article in tissue or bone that is internal or difficult to view directly. In particular, for brain surgery, stereotactic frames that define an entry point, probe angle and probe depth are used to access a site in the brain, generally in conjunction with previously compiled three-dimensional diagnostic images, such as magnetic resonance imaging (MRI), positron emission tomography (PET) or computed tomography (CT) scan images, which provide accurate tissue images. For placement of pedicle screws in the spine, where visual and fluoroscopic imaging directions may not capture an axial view to center a profile of an insertion path in bone, such systems have also been useful.

When used with existing CT, PET or MRI image sets, previously recorded diagnostic image sets define a three dimensional (3D) rectilinear coordinate system, either by virtue of their precision scan formation or by the spatial mathematics of their reconstruction algorithms. However, it may be desirable to correlate the available fluoroscopic views and anatomical features visible from the surface or in fluoroscopic images with features in the 3-D diagnostic images and with external coordinates of tools being employed. Correlation is often done by providing implanted fiducials and/or adding externally visible or trackable markers that may be imaged. Using a keyboard, mouse or other pointer, fiducials may be identified in the various images. Thus, common sets of coordinate registration points may be identified in the different images. The common sets of coordinate registration points may also be trackable in an automated way by an external coordinate measurement device, such as a suitably programmed off-the-shelf optical tracking assembly. Instead of imageable fiducials, which may for example be imaged in both fluoroscopic and MRI or CT images, such systems may also operate to a large extent with simple optical tracking of the surgical tool and may employ an initialization protocol wherein a surgeon touches or points at a number of bony prominences or other recognizable anatomic features in order to define external coordinates in relation to a patient anatomy and to initiate software tracking of the anatomic features.

Generally, image-guided surgery systems operate with an image display which is positioned in a surgeon's field of view and which displays a few panels such as a selected MRI image and several x-ray or fluoroscopic views taken from different angles. Three-dimensional diagnostic images typically have a spatial resolution that is both rectilinear and accurate to within a very small tolerance, such as to within one millimeter or less. By contrast, fluoroscopic views may be distorted. The fluoroscopic views are shadowgraphic in that they represent the density of all tissue through which the conical x-ray beam has passed. In tool navigation systems, the display visible to the surgeon may show an image of a surgical tool, biopsy instrument, pedicle screw, probe or other device projected onto a fluoroscopic image, so that the surgeon may visualize the orientation of the surgical instrument in relation to the imaged patient anatomy. An appropriate reconstructed CT or MRI image, which may correspond to the tracked coordinates of the probe tip, may also be displayed.

Among the systems which have been proposed for implementing such displays, many rely on closely tracking the position and orientation of the surgical instrument in external coordinates. The various sets of coordinates may be defined by robotic mechanical links and encoders, or more usually, are defined by a fixed patient support, two or more receivers such as video cameras which may be fixed to the support, and a plurality of signaling elements attached to a guide or frame on the surgical instrument that enable the position and orientation of the tool with respect to the patient support and camera frame to be automatically determined by triangulation, so that various transformations between respective coordinates may be computed. Three-dimensional tracking systems employing two video cameras and a plurality of emitters or other position signaling elements have long been commercially available and are readily adapted to such operating room systems. Similar systems may also determine external position coordinates using commercially available acoustic ranging systems in which three or more acoustic emitters are actuated and their sounds detected at plural receivers to determine their relative distances from the detecting assemblies, and thus define by simple triangulation the position and orientation of the frames or supports on which the emitters are mounted. When tracked fiducials appear in the diagnostic images, it is possible to define a transformation between operating room coordinates and the coordinates of the image.

More recently, a number of systems have been proposed in which the accuracy of the 3D diagnostic data image sets is exploited to enhance accuracy of operating room images, by matching these 3D images to patterns appearing in intraoperative fluoroscope images. These systems may use tracking and matching edge profiles of bones, morphologically deforming one image onto another to determine a coordinate transform, or other correlation process. The procedure of correlating the lesser quality and non-planar fluoroscopic images with planes in the 3D image data sets may be time-consuming. In techniques that use fiducials or added markers, a surgeon may follow a lengthy initialization protocol or a slow and computationally intensive procedure to identify and correlate markers between various sets of images. All of these factors have affected the speed and utility of intraoperative image guidance or navigation systems.

Correlation of patient anatomy or intraoperative fluoroscopic images with precompiled 3D diagnostic image data sets may also be complicated by intervening movement of the imaged structures, particularly soft tissue structures, between the times of original imaging and the intraoperative procedure. Thus, transformations between three or more coordinate systems for two sets of images and the physical coordinates in the operating room may involve a large number of registration points to provide an effective correlation. For spinal tracking to position pedicle screws, the tracking assembly may be initialized on ten or more points on a single vertebra to achieve suitable accuracy. In cases where a growing tumor or evolving condition actually changes the tissue dimension or position between imaging sessions, further confounding factors may appear.

When the purpose of image guided tracking is to define an operation on a rigid or bony structure near the surface, as is the case in placing pedicle screws in the spine, the registration may alternatively be effected without ongoing reference to tracking images, by using a computer modeling procedure in which a tool tip is touched to and initialized on each of several bony prominences to establish their coordinates and disposition, after which movement of the spine as a whole is modeled by optically initially registering and then tracking the tool in relation to the position of those prominences, while mechanically modeling a virtual representation of the spine with a tracking element or frame attached to the spine. Such a procedure dispenses with the time-consuming and computationally intensive correlation of different image sets from different sources, and, by substituting optical tracking of points, may eliminate or reduce the number of x-ray exposures used to effectively determine the tool position in relation to the patient anatomy with the reasonable degree of precision.

However, each of the foregoing approaches, correlating high quality image data sets with more distorted shadowgraphic projection images and using tracking data to show tool position, or fixing a finite set of points on a dynamic anatomical model on which extrinsically detected tool coordinates are superimposed, results in a process whereby machine calculations produce either a synthetic image or select an existing data base diagnostic plane to guide the surgeon in relation to current tool position. While various jigs and proprietary subassemblies have been devised to make each individual coordinate sensing or image handling system easier to use or reasonably reliable, the field remains unnecessarily complex. Not only do systems often use correlation of diverse sets of images and extensive point-by-point initialization of the operating, tracking and image space coordinates or features, but systems are subject to constraints due to the proprietary restrictions of diverse hardware manufacturers, the physical limitations imposed by tracking systems and the complex programming task of interfacing with many different image sources in addition to determining their scale, orientation, and relationship to other images and coordinates of the system.

Several proposals have been made that fluoroscope images be corrected to enhance their accuracy. This is a complex undertaking, since the nature of the fluoroscope's 3D to 2D projective imaging results in loss of a great deal of information in each shot, so the reverse transformation is highly underdetermined. Changes in imaging parameters due to camera and source position and orientation that occur with each shot further complicate the problem. This area has been addressed to some extent by one manufacturer which has provided a more rigid and isocentric C-arm structure. The added positional precision of that imaging system offers the prospect that, by taking a large set of fluoroscopic shots of an immobilized patient composed under determined conditions, one may be able to undertake some form of planar image reconstruction. However, this appears to be computationally very expensive, and the current state of the art suggests that while it may be possible to produce corrected fluoroscopic image data sets with somewhat less costly equipment than that used for conventional CT imaging, intra-operative fluoroscopic image guidance will continue to involve access to MRI, PET or CT data sets, and to rely on extensive surgical input and set-up for tracking systems that allow position or image correlations to be performed.

Thus, it remains highly desirable to utilize simple, low-dose and low cost fluoroscope images for surgical guidance, yet also to achieve enhanced accuracy for critical tool positioning.

Registration is a process of correlating two coordinate systems, such as a patient image coordinate system and an electromagnetic tracking coordinate system. Several methods may be employed to register coordinates in imaging applications. "Known" or predefined objects are located in an image. A known object includes a sensor used by a tracking system. Once the sensor is located in the image, the sensor enables registration of the two coordinate systems.

U.S. Pat. No. 5,829,444 by Ferre et al., issued on Nov. 3, 1998, refers to a method of tracking and registration using a headset, for example. A patient wears a headset including radiopaque markers when scan images are recorded. Based on a predefined reference unit structure, the reference unit may then automatically locate portions of the reference unit on the scanned images, thereby identifying an orientation of the reference unit with respect to the scanned images. A field generator may be associated with the reference unit to generate a position characteristic field in an area. When a relative position of a field generator with respect to the reference unit is determined, the registration unit may then generate an appropriate mapping function. Tracked surfaces may then be located with respect to the stored images.

However, registration using a reference unit located on the patient and away from the fluoroscope camera introduces inaccuracies into coordinate registration due to distance between the reference unit and the fluoroscope. Additionally, the reference unit located on the patient is typically small or else the unit may interfere with image scanning. A smaller reference unit may produce less accurate positional measurements, and thus impact registration.

Typically, a reference frame used by a navigation system is registered to an anatomy prior to surgical navigation. Registration of the reference frame impacts accuracy of a navigated tool in relation to a displayed fluoroscopic image.

During a procedure, a spinal surgeon must maintain a precise sense of complex 3D anatomical relationships. Fluoroscopy is conventionally used intraoperatively to facilitate visualization of an anatomy (e.g., the pedicle) and placement of tools or implants (e.g., a guide wire or a pedicle screw). While fluoroscopy is useful, it is currently limited to only 2D projections of a complex 3D structure. Furthermore, fluoroscopy is only feasible along axes about the transverse plane, with anteroposterior (AP) and mediolateral (ML) views being most common. In this case, a surgeon cognitively infers surgical placement along a superior/inferior axis (i.e., an axial view) based on interpretation of landmarks in the images and knowledge of the anatomy. These types of inferences may lead to varying degrees of inaccuracy when placing pedicle screws in the spine, for example.

Computed tomographic (CT) imaging yields 3D volumetric images specific to each patient. This set of images may be re-rendered from practically any view and is conventionally presented as a series of axial cross-sections. It is commonly used preoperatively to diagnose a condition and to plan a surgical strategy.

Image guided navigation has been in clinical use for spinal surgery, among other applications. Image guided applications typically employ 2D fluoroscopic images or 3D CT datasets. 3D-based systems require explicit registration of the dataset to the patient, usually accomplished by manual digitization (e.g., picking points) of the patient's anatomy. 2D-based systems are simpler to use since images are intrinsically registered by tracking the imaging device (e.g., a fluoroscope) relative to the patient.

Thus, a hybrid 2D/3D navigation system that incorporates the ease of use and real-time updates of a 2D system along with an easily registered 3D CT dataset would be highly desirable.

Currently, it is difficult for a surgeon or other clinician to see implanted devices during percutaneous procedures. For spinal fusion, rods are inserted into implanted screws. These rods need to be selected or cut to a specific size. Making measurements without direct access to the screws can be problematic and is prone to trial-and-error methods. While not done currently, these distance measurements can be made automatically if the screws are placed with navigation. A difficulty with this approach is finding a way to efficiently filter out the many combinations of measurements and focus on the critical few. This problem becomes worse as the numbers of screws increases for a spinal fusion with several levels.

Additionally, despite advances in preoperative planning software and surgical instrument systems, many measurements are still made during a surgical procedure. For instance, a surgeon may decide what diameters and lengths of pedicle screws he or she will use for a spinal fusion case based on anatomic measurements off of a CT scan of a patient's spine.

Currently, after placing an implant, a surgeon performs an intra-operative 3D scan of a patient to confirm that the implanted device is well placed. The intra-operative 3D scan requires the usage of an expensive 3D system that may not be always available during an operation. Typically, the surgeon uses a 2D system intra-operatively and is limited to 2D analysis of the placed implants during an operation.

Thus, there is a need for improved intra-operative imaging and review. There is a need for systems and methods for implant virtual review.

BRIEF SUMMARY OF THE INVENTION

Certain embodiments of the present invention provide systems and methods for virtual implant review.

Certain embodiments provide a method for virtual implant review. The method includes registering a two-dimensional image and a three-dimensional image. The method includes detecting an implant or instrument in the two-dimensional image. The method also includes performing an initial implant registration of the implant or instrument with respect to the three dimensional image based on navigation information and refining the initial implant registration based on image data analysis to generate a refined implant registration. Additionally, the method includes displaying a representation of the implant or instrument with respect to the three-dimensional image based on the refined image registration and the refined implant registration.

Certain embodiments provide a user interface system for virtual implant review. The system includes a processor configured to determine a registration of a two-dimensional image and a three-dimensional image of an object. The processor is also configured to determine an initial implant registration of an implant or instrument based on tracking data and to refine the initial implant registration based on image data of the implant or instrument. The system further includes a display, such as a hardware and/or software display module, configured to display a three-dimensional image including a representation of the implant to a user.

Certain embodiments provide a computer-readable medium having a set of instructions for execution on a computer. The set of instructions includes a registration routine and a display routine. The registration routine is configured to registration an image in a three-dimensional coordinate space. The registration routine is configured to perform an initial image registration of a two-dimensional image in a three-dimensional coordinate space based on navigation information and refine the initial image registration based on image data analysis to generate a refined image registration. The registration routine is also configured to perform an initial implant registration of an implant or instrument in the three dimensional coordinate space based on navigation information and refining the initial implant registration based on image data analysis to generate a refined implant registration. The display routine is configured to display a representation of the implant or instrument with respect to a three-dimensional image data set based on the refined image registration and the refined implant registration.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
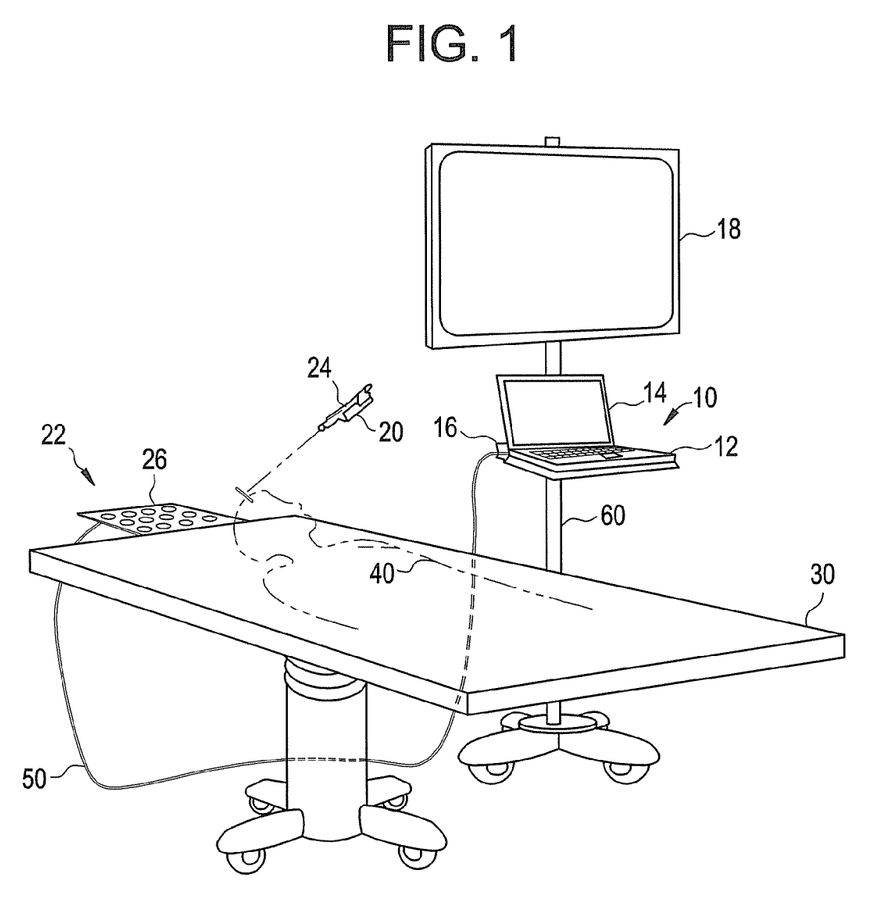
FIG. 1 illustrates a medical navigation system used in accordance with an embodiment of the present invention.

Referring now to FIG. 1, a medical navigation system (e.g., a surgical navigation system), designated generally by reference numeral 10, is illustrated as including a portable computer 12, a display 14, and a navigation interface 16. The medical navigation system 10 is configured to operate with an electromagnetic field generator 20 and electromagnetic sensor 22 to determine the location of a device 24. Although the system 10 and/or other navigation or tracking system may be used in conjunction with a variety of tracking technologies, including electromagnetic, optical, ultrasound, inertial position and/or other tracking systems, for example, the system 10 is described below with respect to electromagnetic tracking for purposes of illustration only.

A table 30 is positioned near the electromagnetic sensor 22 to support a patient 40 during a surgical procedure. A cable 50 is provided for the transmission of data between, the electromagnetic sensor 22 and the medical navigation system 10. The medical navigation system 10 is mounted on a portable cart 60 with a second display 18 in the embodiment illustrated in FIG. 1.

The electromagnetic sensor 22 may be a printed circuit board, for example. Certain embodiments may include an electromagnetic sensor 22 comprising a printed circuit board receiver array 26 including a plurality of coils and coil pairs and electronics for digitizing magnetic field measurements detected in the printed circuit board receiver array 26. The magnetic field measurements can be used to calculate the position and orientation of the electromagnetic field generator 20 according to any suitable method or system. After the magnetic field measurements are digitized using electronics on the electromagnetic sensor 22, the digitized signals are transmitted to the navigation interface 16 through cable 50. As will be explained below in detail, the medical navigation system 10 is configured to calculate a location of the device 24 based on the received digitized signals.

The medical navigation system 10 described herein is capable of tracking many different types of devices during different procedures. Depending on the procedure, the device 24 may be a surgical instrument (e.g., an imaging catheter, a diagnostic catheter, a therapeutic catheter, a guidewire, a debrider, an aspirator, a handle, a guide, etc.), a surgical implant (e.g., an artificial disk, a bone screw, a shunt, a pedicle screw, a plate, an intramedullary rod, etc.), or some other device. Depending on the context of the usage of the medical navigation system 10, any number of suitable devices may be used.

Figure 2:
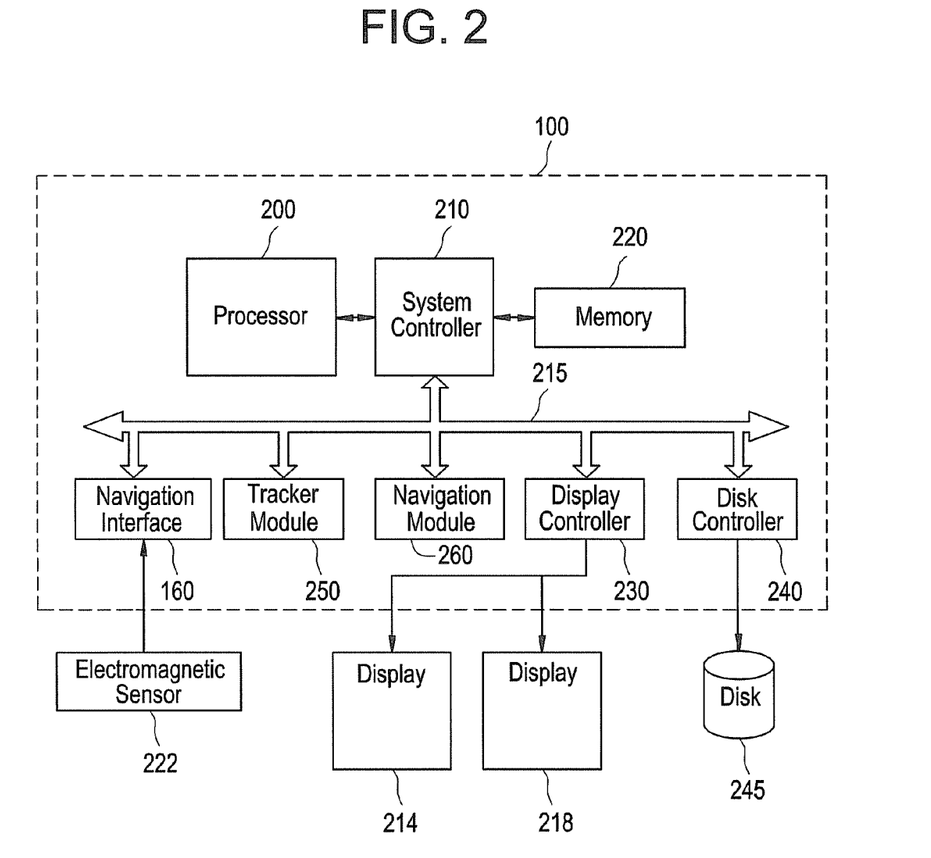
FIG. 2 illustrates a medical navigation system used in accordance with an embodiment of the present invention.

With regards to FIG. 2, an exemplary block diagram of the medical navigation system 100 is provided. The medical navigation system 100 is illustrated conceptually as a collection of modules, but may be implemented using any combination of dedicated hardware boards, digital signal processors, field programmable gate arrays, and processors. Alternatively, the modules may be implemented using an off-the-shelf computer with a single processor or multiple processors, with the functional operations distributed between the processors. As an example, it may be desirable to have a dedicated processor for position and orientation calculations as well as a dedicated processor for visualization operations. As a further option, the modules may be implemented using a hybrid configuration in which certain modular functions are performed using dedicated hardware, while the remaining modular functions are performed using an off-the-shelf computer. The operations of the modules may be controlled by a system controller 210.

The navigation interface 160 receives digitized signals from an electromagnetic sensor 222. In the embodiment illustrated in FIG. 1, the navigation interface 16 includes an Ethernet port. This port may be provided, for example, with an Ethernet network interface card or adapter. However, according to various alternate embodiments, the digitized signals may be transmitted from the electromagnetic sensor 222 to the navigation interface 160 using alternative wired or wireless communication protocols and interfaces.

The digitized signals received by the navigation interface 160 represent magnetic field information detected by an electromagnetic sensor 222. In the embodiment illustrated in FIG. 2, the navigation interface 160 transmits the digitized signals to the tracker module 250 over a local interface 215. The tracker module 250 calculates position and orientation information based on the received digitized signals. This position and orientation information provides a location of a device.

The tracker module 250 communicates the position and orientation information to the navigation module 260 over a local interface 215. As an example, this local interface 215 is a Peripheral Component Interconnect (PCI) bus. However, according to various alternate embodiments, equivalent bus technologies may be substituted without departing from the scope of the invention.

Upon receiving the position and orientation information, the navigation module 260 is used to register the location of the device to acquired patient data. In the embodiment illustrated in FIG. 2, the acquired patient data is stored on a disk 245. The acquired patient data may include computed tomography data, magnetic resonance data, positron emission tomography data, ultrasound data, X-ray data, or any other suitable data, as well as any combinations thereof. By way of example only, the disk 245 is a hard disk drive, but other suitable storage devices and/or memory may be used.

The acquired patient data is loaded into memory 220 from the disk 245. The navigation module 260 reads from memory 220 the acquired patient data. The navigation module 260 registers the location of the device to acquired patient data, and generates image data suitable to visualize the patient image data and a representation of the device. In the embodiment illustrated in FIG. 2, the image data is transmitted to a display controller 230 over a local interface 215. The display controller 230 is used to output the image data to two displays 214 and 218.

While two displays 214 and 218 are illustrated in the embodiment in FIG. 2, alternate embodiments may include various display configurations. Various display configurations may be used to improve operating room ergonomics, display different views, or display information to personnel at various locations. For example, as illustrated in FIG. 1, a first display 14 may be included on the medical navigation system 10, and a second display 18 that is larger than first display 14 is mounted on a portable cart 60. Alternatively, one or more of the displays 214 and 218 may be mounted on a surgical boom. The surgical boom may be ceiling-mounted, attachable to a surgical table, or mounted on a portable cart.

Figure 3:
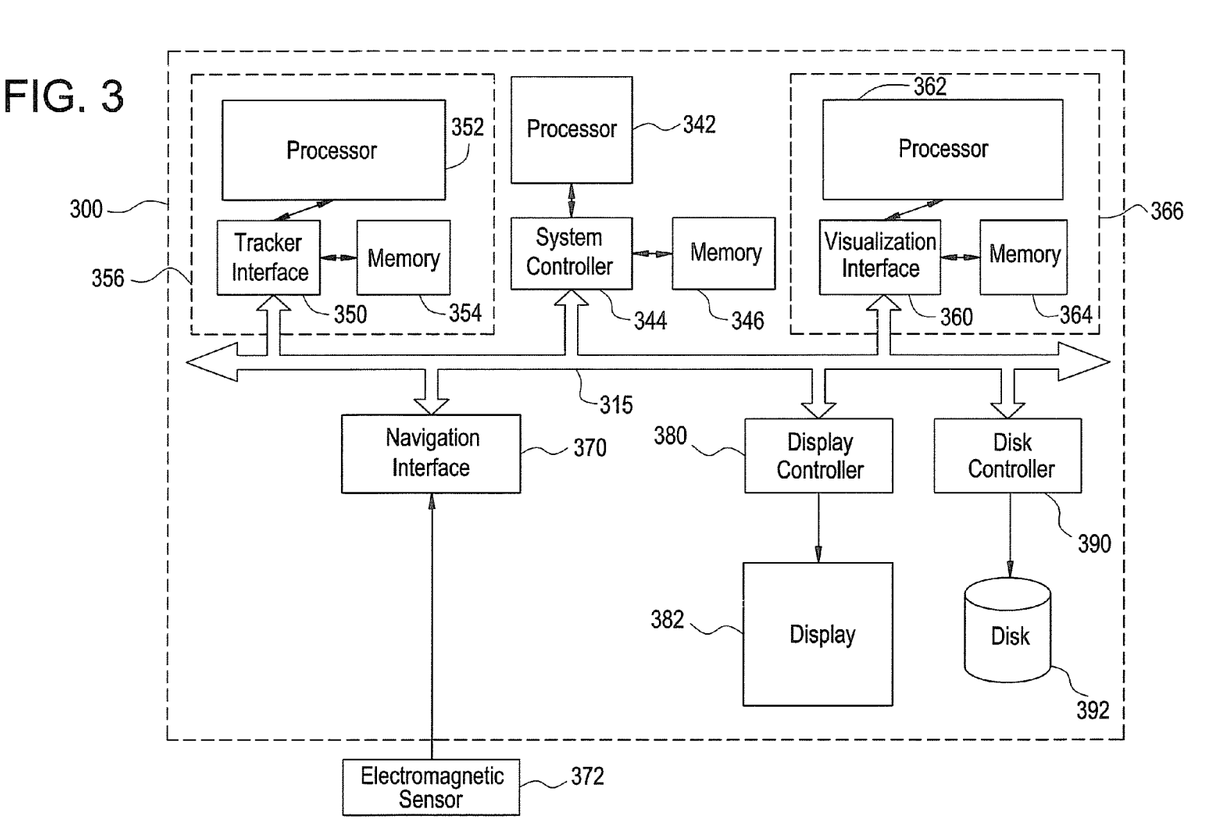
FIG. 3 illustrates a medical navigation system used in accordance with an embodiment of the present invention.

Referring now to FIG. 3, an alternative embodiment of a medical navigation system 300 is illustrated. The medical navigation system 300 comprises a portable computer with a relatively small footprint (e.g., approximately 1000 cm$^2$) and an integrated display 382. According to various alternate embodiments, any suitable smaller or larger footprint may be used.

The navigation interface 370 receives digitized signals from an electromagnetic sensor 372. In the embodiment illustrated in FIG. 3, the navigation interface 370 transmits the digitized signals to the tracker interface 350 over a local interface 315. In addition to the tracker interface 350, the tracker module 356 includes a processor 352 and memory 354 to calculate position and orientation information based on the received digitized signals.

The tracker interface 350 communicates the calculated position and orientation information to the visualization interface 360 over a local interface 315. In addition to the visualization interface 360, the navigation module 366 includes a processor 362 and memory 364 to register the location of the device to acquired patient data stored on a disk 392, and generates image data suitable to visualize the patient image data and a representation of the device.

The visualization interface 360 transmits the image data to a display controller 380 over a local interface 315. The display controller 380 is used to output the image data to display 382.

The medical navigation system 300 also includes a processor 342, system controller 344, and memory 346 that are used for additional computing applications such as scheduling, updating patient data, or other suitable applications. Performance of the medical navigation system 300 is improved by using a processor 342 for general computing applications, a processor 352 for position and orientation calculations, and a processor 362 dedicated to visualization operations. Notwithstanding the description of the embodiment of FIG. 3, alternative system architectures may be substituted without departing from the scope of the invention.

As will be described further below, certain embodiments of the present invention provide intraoperative navigation on 3D computed tomography (CT) datasets, such as an axial view, in addition to 2D fluoroscopic images. In certain embodiments, the CT dataset is registered to the patient intra-operatively via correlation to standard anteroposterior and lateral fluoroscopic images. Additional 2D images can be acquired and navigated as the procedure progresses without the need for re-registration of the CT dataset.

Certain embodiments provide tools enabling placement of multilevel procedures. Onscreen templating may be used to select implant length and size. The system may memorize the location of implants placed at multiple levels. A user may recall stored overlays for reference during placement of additional implants. Additionally, certain embodiments help eliminate trial-and-error fitting of components by making navigated measurements. In certain embodiments, annotations appear onscreen next to relevant anatomy and implants.

Certain embodiments utilize a correlation based registration algorithm to provide reliable registration. Standard anteroposterior (AP) and lateral (Lat) fluoroscopic images may be acquired. A vertebral level is selected, and the images are registered. The vertebral level selection is accomplished by pointing a navigated instrument at the actual anatomy, for example.

Certain embodiments of the system work in conjunction with a family of spine instruments and kits, such as a spine visualization instrument kit, spine surgical instrument kit, cervical instrument kit, navigation access needle, etc. These instruments facilitate the placement of a breadth of standard pedicle screws, for example. A library of screw geometries is used to represent these screws and facilitate an overlay of wireframe to fully shaded models. The overlays can be stored and recalled for each vertebral level.

In certain embodiments, recalled overlays can be displayed with several automatic measurements, including distance between multilevel pedicle screws, curvature between multilevel pedicle screws and annotations of level (e.g., Left L4 vertebra), for example. These measurements facilitate more precise selection of implant length and size. These measurements also help eliminate trial-and-error fitting of components.

Thus, certain embodiments aid a surgeon in locating anatomical structures anywhere on the human body during either open or percutaneous procedures. Certain embodiments may be used on lumbar and/or sacral vertebral levels, for example. Certain embodiments provide Digital Imaging and Communications in Medicine (DICOM) compliance and support for gantry tilt and/or variable slice spacing. Certain embodiments provide auto-windowing and centering with stored profiles. Certain embodiments provide a correlation-based 2D/3D registration algorithm and allow real-time multiplanar resection, for example.

Certain embodiments allow a user to store and recall navigated placements Certain embodiments allow a user to determine a distance between multilevel pedicle screws and/or other implants/instruments. Certain embodiments allow a user to calculate interconnecting rod length and curvature, for example.

In certain embodiments, a user places screws and/or other implant(s) using navigation/tracking to obtain a position of the screws/other implants. While it is understood that a variety of implants may be used, the following description will be discussed in connection with a screw, such as a pedicle screw, for purposes of illustration only. Using navigation, the system remembers (e.g., stores in memory) locations of the placed screws. Based on position and orientation data gained from navigation, measurements of distances between the placed screws may be calculated.

The user then selects a desired view of the placed screws (e.g., an AP view), and the locations of the screws are shown with a marker or virtual screw overlay, for example. The user is able to choose from a variety of possible intra-screw measurements by aligning a trajectory of a pointer or other instrument with an axis along which the user is interesting in measuring. The trajectory may be determined by sampling the currently navigated (i.e., tracked) tool trajectory and/or by manipulating an on-screen widget, for example.

For example, to measure intra-screw distances for a spinal fusion, a user may select an AP view of the screws. Then, the user aligns a tool along a patient Superior-Inferior direction.

To measure a cross-vertebral distance, the user aligns the current tool trajectory along a patient Right-Left direction. When the user aligns the tool trajectory with a measurement, that measurement is retrieved from memory and/or calculated based on tracking information and presented to the user. The distance measurement may be displayed in a text-based and/or graphical form to the user, for example.

Thus, a user may measure distances above the skin without an invasive procedure. Providing information through a user interface facilitates a surgeon's direct filtering of the information displayed using the physical analog of the navigated instrument. Additionally, the surgeon does not need to break the sterile field. Certain embodiments intuitively interact with the user to target desired information.

In certain embodiments, a user employs an imaging system, such as a mobile fluoroscopy system with surgical navigation. The imaging system includes a navigated tool to which an implant, such as a pedicle screw, may be attached. The system also includes a local reference frame for a patient's anatomy.

In certain embodiments, a navigation system is used with an imaging system to track implants (e.g., screws) inserted into a patient. At least two fluoroscopic image shots are taken to confirm the implant positioning. The obtained "control" shots are registered images. Additionally, the implant shape is known by the system. An image based 2D/3D registration technique uses the known implant shape to register the implant. The registered implant can then be displayed within a registered 3D dataset of the anatomy mimicking postoperative review.

Prior to an operation, a CT scan of a patient may be obtained. Then, during surgery, a 2D view may be acquired. The pre-operative CT may be updated with image information obtained during surgery using 2D fluoroscopic images. Implant position may be updated not only in 2D but also in 3D based on image and navigation data, for example.

Figure 4:
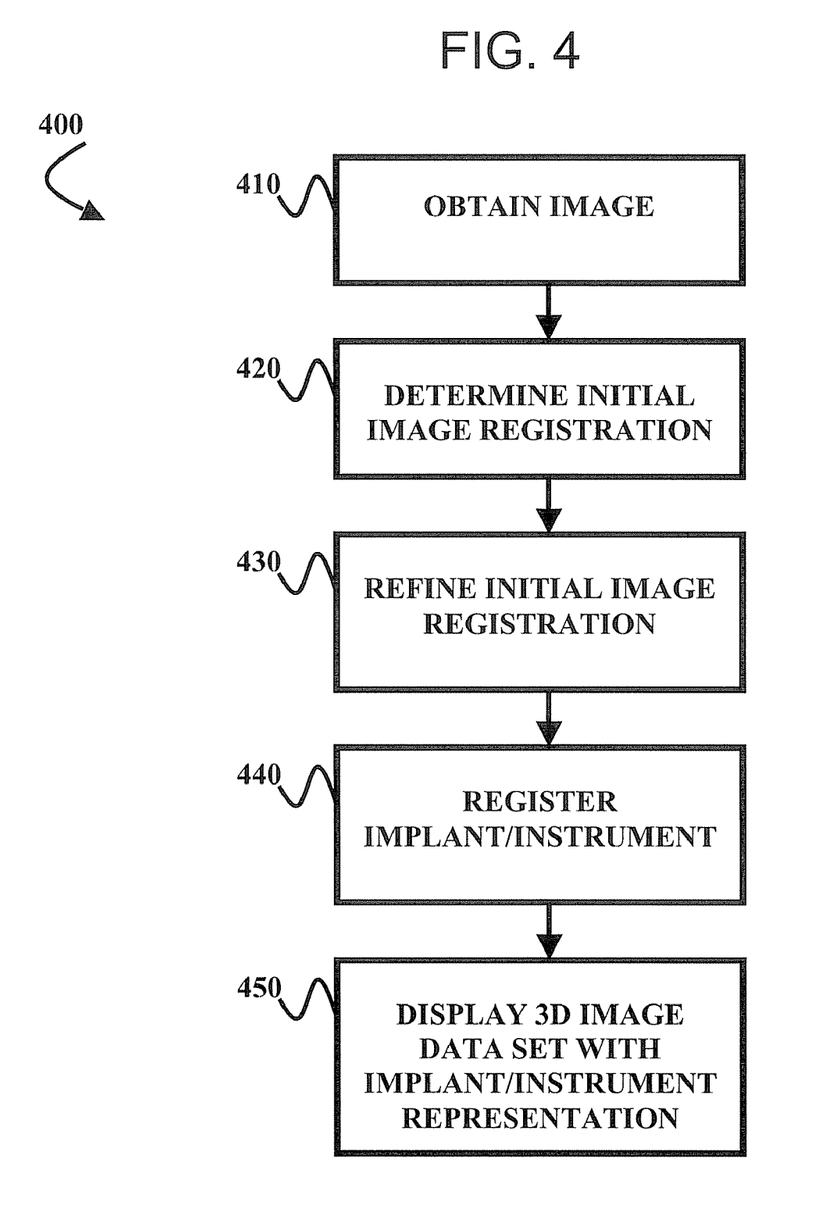
FIG. 4 illustrates a flowchart for a method for implant virtual review used in accordance with an embodiment of the present invention.

FIG. 4 illustrates a flowchart for a method 400 for virtual implant review used in accordance with an embodiment of the present invention. At step 410, an image, such as a 2D fluoroscopic image view, of a patient is obtained. The image may be acquired by a medical imaging system, for example. For example, the medical image may be acquired by an acquisition component of a medical imaging system. A position of the image is known because a position of an image acquisition device (e.g., a position of the C-arm) and a position of the patient are being navigated.

At step 420, an initial registration of the image is determined. For example, navigation or tracking information related to the image can be used as seed or initial data to register the image in an image acquisition coordinate space. For example, an image acquisition configuration or model of an AP view and/or of a ML view are determined, and the position of the view(s) relative to the patient is determined. In certain embodiments, subsequently acquired images may also have a relative position determined based on the first image and/or a previously acquired image.

In certain embodiments, the initial registration of the image view to the data set may be based at least in part on user input. For example, the user may be presented with one or more images and guided to touch anatomic landmarks with a tracked instrument. For example, the user may be prompted to touch the spinous process with a tracked surgical tool. As another example, the user may be requested to verify that the trajectory display and alignment of the tracked instrument appears correct in several displayed orientations.

In certain embodiments, the initial registration is based on a region of interest. The tracking accuracy of a tracked instrument may be higher in the region of interest. For example, more registration points may be used in the region of interest. As another example, the user may be asked to verify one or more registration locations within the region of interest. The region of interest may be defined by a user, such as a surgeon, for example. For example, at the beginning of a procedure, the user may define the region of interest on a vertebrae level to be operated on. The medical navigation system may then make the initial registration to the data set based at least in part on the region of interest.

In certain embodiments, the initial registration is based at least in part on a verification location. For example, the user may be prompted to touch one or more anatomical features with a tracked instrument to verify the initial registration. The initial registration may include an error estimate. The error estimate represents an estimate of the error in the registration.

At step 430, the initial registration of the image is refined. For example, a registration algorithm is used to refine registration of image views to a pre-operative CT data set. For example, image content values, such as grayscale values, are used to register AP and ML, image views to the CT data set. That is, a second image (e.g., an AP and/or ML image view) image is obtained, and image data analysis is used to refine the initial image coordinate space registration from navigation data.

At step 440, registration, such as one or more of the registration examples described above, is applied to an implant or instrument being used on or in the patient. For example, a computer-aided design model or other similar model of the implant/instrument is obtained from a database or other data store. The implant/instrument is modeled in three dimensions. Image views, such as AP and ML views, display implant/instrument with respect to the patient in the two views.

As described above, an approximate position of the implant/instrument is determined from tracking data related to the implant/instrument. The tracking data may be input into a registration algorithm to converge an implant/instrument registration. For example, a gray level or other method is used to improve registration between the implant/instrument and the CT data set, which was previously registered.

At step 450, a representation registered implant or instrument, which has been registered in the 3D image space, is displayed to the surgeon in conjunction with the three-dimensional CT data set. The surgeon may view a position of the implant/instrument in 3D space during an operation without obtaining additional real-time 3D images beyond the preoperative 3D data set.

Thus, a 3D data set is used to model a 3D space. A 2D position of the implant/instrument is known relative to two or more image views, such as AP and ML views. An initial estimation of position can be obtained from navigation information for the implant/instrument. The initial position estimation is used for an initial 3D registration of the implant/instrument with respect to the 3D data set. Then, a registration algorithm, such as a gray level algorithm, is used to refine that estimation to register the implant/instrument to the 3D data set. The registered implant/instrument and 2D image view(s) are then displayed to the surgeon.

Because the first and second images are acquired during the same procedure, although perhaps at different times during the procedure, the images are related. For example, the relative positions of the images may be known or the anatomical regions covered by the images may overlap. Thus, by taking the seed points in the first image out and performing the second registration, the second registration may be used to check the registration of the first image. In the case where a sequence of images is acquired and iteratively registered, registration of subsequent images may similarly be based oil prior registrations. Such registration is based on closed-loop quantitative feedback, for example.

An error estimate determined with the initial registration may be refined based on the second registration. For example, the error estimate may be refined based at least in part on the anatomical region included in the second image. Then, the medical navigation system may select which registration to use based on which image is closest to the current location of a tracked instrument. In the case where a sequence of images is acquired and iteratively registered, the error estimate may be refined based at least in part on one or more of the iterative registrations. In certain embodiments, a difference or delta between a navigated implant or instrument position and a registered implant/instrument position may be determined and provided as feedback to the navigation system. In certain embodiments, a difference or delta between a registered implant/instrument position and a planned implant/instrument position may be determined and provided as feedback to the navigation system.

In certain embodiments, the second registration is determined automatically. That is, the registration of the second image is determined without input from the user, in contrast to the registration of the first image. A medical navigation system may determine the second registration based on the known relative position between the second image and the first image, as discussed above, for example. Thus, no user input may be necessary to register the second image.

In certain embodiments, the automatic determination of the registration of the second image occurs as a background process in the medical imaging system. That is, when the second or a subsequent image is acquired, the registration may occur automatically and transparently to the user.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Figure 5:
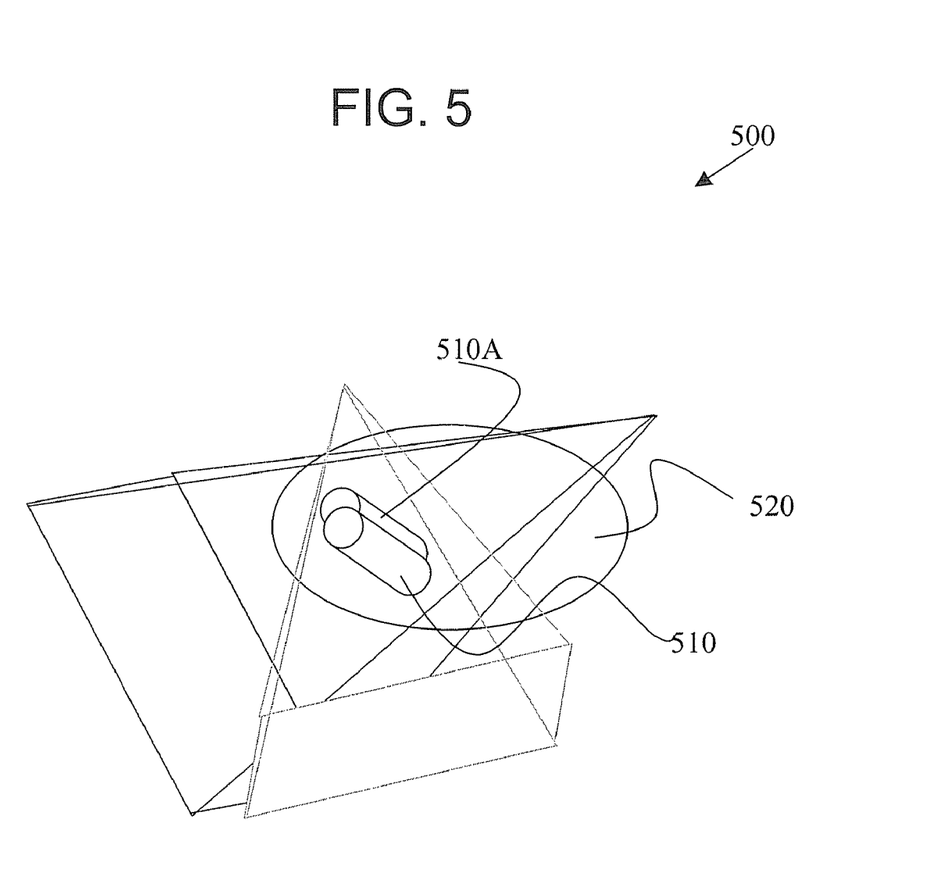
FIG. 5 illustrates a representation of an exemplary 3D image with implant overlay according to an embodiment of the present invention.

FIG. 5 illustrates a representation of an exemplary 3D image with implant overlay according to an embodiment of the present invention. As illustrated in FIG. 5, a navigation display shows a real-time (or substantially real-time due to an inherent system delay) position and orientation of a model or representation of implant 510 (e.g., a screw) with respect to a 3D image data set 520 (e.g., a 3D CT scan data set), for example. The position and orientation of the implant model 510 may also be displayed on one or more registered 2D fluoroscopic images. The implant model 510 may appear as a line rendering, a few simply shaded geometric primitives (e.g., a parametric model containing two cylinders representing the screw head and body), or a realistic 3D model from a computer-aided design (CAD) file, for example.

Regardless of the visualization using to depict the implant, the implant model includes representations of key features of the implant that may be used for subsequent measurements. For example, the screw model includes a point feature for a center of a rod slot in the screw head. Additionally, the model may include a vector feature describing the orientation of the rod slot, for example.

For example, a surgeon uses the navigated tool to place a first screw into a vertebra. The surgeon then places a second screw into an adjacent vertebra. Each time a screw is placed, the screw's location is stored on the navigation system with respect to the local reference frame. This process can be repeated for all vertebral levels involved in the surgical procedure.

As shown, for example, in FIG. 5, a virtual placement of the implant 510 is represented on the 3D image set 520. A representation 510a of the implant 510 illustrates a more accurate position of the implant 510 based on image recalibration, described above. Image projections may be reviewed to correct implant position. In certain embodiments, placements 510 and/or 510a may be compared to a planned implant placement position.

Positional (and orientation) measurements of the implant 510 may be taken automatically by a tracking system and/or in conjunction with a user initiation (e.g., by user trigger based on a button click, pressure on the tool, keyboard selection, mouse selection, etc.), for example. In certain embodiments, position and orientation data may be measured for the implant in real-time or substantially in real-time as the implant is placed by the user. An implant center point, such as a center of an implant screw head, may be identified and used for measurement purposes, for example.

The position of the screw may be known due to navigation/tracking measurement, as described above, and/or through image processing without navigation, for example. Position and orientation of the implant may be measured and/or represented in 2D space, 3D space and/or a combination of 2D and 3D space, for example. In certain embodiments, position and distance measurement data may be presented to a user in an absence and/or aside from an image display.

In certain embodiments, a measurement may be identified through positioning of a navigated or otherwise tracked instrument with respect to the image of the patient anatomy, touchscreen selection with respect to the image, keyboard selection and/or mouse selection, for example. In an embodiment, a user positions a navigated or tracked instrument with respect to the image of the patient anatomy, such as the image of FIG. 5. When the instrument is aligned or substantially aligned with a measurement, that measurement is determined for the user.

Thus, certain embodiments provide a 2D system that can be used to perform a virtual 3D review without the need of an expensive 3D system. Thus, certain embodiments can provide an intraoperative and/or postoperative review using a 2D system and image data in conjunction with previously obtained 3D image data. Certain embodiments allow comparison to a virtually placed screw or other implant (such as by using a freeze trajectory feature). In certain embodiments, accuracy may be increased by reducing instrument navigation error due to instrument calibration and tracking, for example. Certain embodiments provide axial view 3D information in a 2D format.

Thus, 2D/3D registration and navigation may be used as a review tool. Navigation error may be reduced by correlating navigation information with imaging information.

Certain embodiments may operate in conjunction with a 2D/3D hybrid navigation system incorporates real-time updating and ease of use of a 2D system along with an easily registered 3D CT dataset. Safety and precision of medical procedures may be enhanced with a 2D/3D navigation system. Use of a CT dataset along with 2D intraoperative imaging adds to visualization and understanding of an anatomy in an operating room. Such a system may have applicability in a variety of medical procedures, such as spinal procedures, cranial procedures and other clinical procedures. Spinal procedures may include posterolateral open and minimally invasive surgical (MIS) pedicle screws, posterior C1-C2 transarticular screw fixation, transoral odontoid fixation, cervical lateral mass plate screw fixation, anterior thoracic screw fixation, scoliosis, kyphosis, kyphoplasty, vertebroplasty, transforaminal lumbar interbody fusion (TLIF), artificial disks, burst fractures, excision of paraspinal neoplasms, etc.

Although the systems and methods described herein may be used with a variety of implants, an example of a screw (and more specifically a pedicle screw) is used for convenient purposes of illustration only. Such an example is not intended to limit the embodiments disclosed and encompassed herein to screw implants. For example, systems and methods may be used in conjunction with insertion of a stent into a patient blood vessel. A wire or other guide may be fed into the vessel with markings on the wire to allow navigated measurement of points along the wire. Distance measurement along the wire may be sued to recommend and/or aid in determination of stent and/or balloon size, for example. In certain embodiments, any hardware introduced into a patient for which position measurements may be obtained may be used in conjunction with distance measurement as described above.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, embodiments within the scope of the present invention include program products comprising machine-readable media for candying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any medical navigation system. Certain features of the embodiments of the claimed subject matter have been illustrated as described herein, however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A method for virtual implant review, said method comprising:
registering a two-dimensional image and a three-dimensional image;
detecting an implant or instrument in said two-dimensional image;
performing an initial implant registration of said implant or instrument detected in said two-dimensional image with respect to said three-dimensional image based on navigation information;
refining said initial implant registration based on image data analysis of said two-dimensional image to generate a refined implant registration;
displaying a representation of said implant or instrument with respect to said three-dimensional image based on said refined implant registration;
computing a difference between said refined implant registration and a planned implant registration; and,
adjusting a navigation system based on said difference between said refined implant registration and said planned implant registration.

2. The method of claim 1, wherein said step of registering said two-dimensional image and said three-dimensional image comprises at least one of contour matching, landmark matching, surface-volume matching and fiducial registration.

3. The method of claim 1, further comprising storing implant placement and distance measurement information for subsequent implant placement.

4. The method of claim 1, wherein said representation of said implant or instrument comprises a library representation of said implant or instrument.

5. The method of claim 1, wherein said implant or instrument is graphically rendered and overlaid on said three-dimensional image data set with trajectory information and distance information.

6. The method of claim 1, wherein said step of refining said initial image registration further comprises refining said initial image registration using image data from a plurality of two-dimensional images.

7. The method of claim 1, wherein said step of refining said initial implant registration further comprises correlating navigation information with imaging information from a plurality of two-dimensional images.

8. A user interface system for virtual implant review, said system comprising:
a processor configured to determine a registration of a two-dimensional image of an object and a three-dimensional image of said object, said processor configured to determine an initial implant registration of an implant or instrument based on tracking data and to refine said initial implant registration based on said two-dimensional image of said implant or instrument within said three-dimensional image, wherein said processor further computes a difference between said refined implant registration and a planned implant registration;
a navigation system obtaining tracking data relative to said image and said implant or instrument, said navigation system capable of being adjusted based on said difference between said refined implant registration and said planned implant registration; and
a display configured to display a three-dimensional image including a representation of said implant to a user.

9. The system of claim 8, wherein said processor stores implant placement and distance measurement information for subsequent implant placement.

10. The system of claim 8, wherein said representation of said implant or instrument comprises a library representation of said implant or instrument.

11. The system of claim 8, wherein said display graphically renders said implant or instrument and overlays said graphical rendering of said implant or instrument on said three-dimensional image with trajectory and distance measurement information.

12. The system of claim 8, wherein said processor refines said initial image registration using image data from a plurality of two-dimensional images.

13. The system of claim 8, wherein said processor refines said initial implant registration by correlating navigation information with imaging information from a plurality of two-dimensional images.

14. The system of claim 8, wherein said step of registering said two-dimensional image and said three-dimensional image comprises at least one of contour matching, landmark matching, surface-volume matching and fiducial registration.

15. A non-transitory computer-readable medium having a set of instructions for execution on a computer, said set of instructions comprising:
a registration routine configured to register an image in a three-dimensional coordinate space, said registration routine performing an initial image registration of a two-dimensional image in a three-dimensional coordinate space based on navigation information and refining said initial image registration based on image data analysis of the two-dimensional image to generate a refined image registration, and said registration routine performing an initial implant registration of an implant or instrument in said three dimensional coordinate space based on navigation information and refining said initial implant registration based on said two-dimensional image analysis to generate a refined implant registration, wherein said registration routine computes a difference between said refined implant registration and a planned implant registration, and is configured to adjust a navigation system based on said difference between said refined implant registration and said planned implant registration; and
a display routine configured to display a representation of said implant or instrument with respect to a three-dimensional image data set based on said refined image registration and said refined implant registration.

* * * * *